United States Patent Office 3,136,681
Patented June 9, 1964

3,136,681
ADHESIVE COMPOSITION AND METHOD OF APPLYING SAME
James E. Johnston, Los Angeles, Calif., assignor to Minnesota Mining and Manufacturing Company, St. Paul, Minn., a corporation of Delaware
No Drawing. Filed Oct. 14, 1959, Ser. No. 846,263
6 Claims. (Cl. 161—190)

This invention relates to an adhesive or cement composition and the method of applying same. In one aspect, the invention relates to bonded surfaces. In still another aspect, this invention relates to bonding or adhering together two surfaces.

Compositions suitable for adhering or bonding two surfaces together are known in the art. In many instances, such adhesives or cements are applied to the surfaces in a grease or liquid form and then are cured to a tough, strong bond between the surfaces. In applying the adhesive and permitting the cure to bond the surfaces, some technique must be used to hold the surfaces securely together until the adhesive is cured to complete the bond. One of the most frequent and usual applications of this bonding technique is the bonding together or seaming of synthetic fabrics. In such instances, to extend the width or length of the fabric, the fabrics are overlapped and the uncured adhesive is placed between the overlap of the fabrics along the seam. Then in order to secure the fabrics until the bond is complete, the fabrics are sewed together at the seam. The above technique, in such instances, is cumbersome and requires extra labor and time. In addition, the sewing of the seam produces holes in the fabric.

It is much to be desired to overcome the above and also provide an improved inert adhesive which can be easily applied and has a sufficient initial bond strength to hold the fabrics or surfaces together until curing is effected without the necessity of external means therefor.

The object of this invention is to provide a new adhesive or cement system.

Still another object of this invention is to provide an improved technique of bonding or adhering together two surfaces.

Another object of this invention is to provide a solvent-resistant and heat stable bond between two surfaces.

Yet another object of this invention is to provide a room temperature or low temperature curable composition.

Another object of this invention is to provide a two part adhesive or bonding system.

Various other objects and advantages will become apparent to those skilled in the art from the accompanying description and disclosure.

According to this invention, a two part adhesive or bonding system is provided in which one part includes the curing agent or cross-linking agent and the other part includes a curable polymer or adduct which provides the bond when cured. These two parts are usually maintained separate until bonding of the material or surfaces is desired. At that time they are admixed and applied to the surface or surfaces and then the surfaces are contacted and maintained together until the bond is effected. An essential feature of the present invention is the inclusion in this two part bonding system of a prebonding vinyl polymer which will hold the bonded surfaces together until curing is complete. This material eliminates the necessity for special techniques in maintaining the surfaces in contact until the bond is completed. This prebonding component may be admixed with either or both the curing agent or the curable polymer prior to application to the surfaces to be bonded. The prebonding component is substantially inert in the system. In addition to the above components a suitable filler is included in this system with either or both parts thereof. Such filler, such as silica, imparts strength and improves the viscosity and bodying properties to the precured composition as well as the cured composition.

Since the composition of this invention is utilized to bond surfaces together, it must be applied in the form of a liquid or paste. Therefore, the curable polymer or adduct and curing agent are preferably separately dispersed or dissolved in a suitable liquid vehicle. The prebonding polymer and fillers may be ingredients in either of the separate solutions or both. The solutions are mixed immediately prior to use. The resulting solution after admixture should have a viscosity between about 50 and about 250 centipoises at 20° C. The solvent should be such that the composition has a certain amount of tack after application, usually after a few minutes of drying. Where the composition of this invention requires elevated temperatures for curing, such as temperatures above 35° C., one solution of the components may be used without the necessity for maintaining separate the curable polymer and the curing agent.

The prebonding component of the above system comprises an easily crystallizable or orientable vinyl polymer which is soluble in organic solvents. This prebonding component imparts initial bonding strength to the adhesive composition. The average molecular weight of the crystallizable polymer should be above 20,000 and as high as 100,000 or higher in order for strength and physical characteristics to be suitable to apply as part of the composition. This prebonding component should be orientable under a stress of 50 to 200 pounds per square inch. The orientation of the prebonding polymer resists displacement of the bonded seam during curing, thereby maintaining the seam in place. Suitable vinyl polymers of this nature comprise organic polymers of monoethylenically unsaturated organic monomers, such as vinylidene chloride, vinyl acetate, chloroprene, vinyl chloride and lower alkyl esters of acrylic, methacrylic and chloroacrylic acids. Numerous of these polymers are commercially available on the market. For example, Saran is a polymer of vinylidene chloride having the above properties. Neoprene is another available polymer which is produced from chloroprene. Also, Lucite is a polymer of methylmethacrylic. Vinylite is a copolymer of vinyl chloride and vinyl acetate. Polyvinylacetate is also a commercially available polymer satisfying the above requirements. The preferred vinyl polymers are the polymers of vinylidene monomers, such as vinylidene chloride.

The curable component of the above system comprises a polyfunctional adduct or polymer having an average molecular weight not higher than 10,000, usually in a molecular weight range of about 300 to about 5,000. This curable polymer should be in a liquid or greasy or waxy state of relatively low molecular weight in order that it will be of the required physical nature when applied to the surface. The curable polymer is cured with a curing agent to be defined hereinafter to produce a strong bond of considerably higher molecular weight. As the functional groups, the curable polymer must have active hydrogen attached to an atom other than carbon of the polymer. It is the active hydrogen which forms the sites for cross-linking as the result of the removal thereof from the polymer structure.

As an example of a class of suitable curable polymers having an active hydrogen are the carboxyl- and hydroxyl-terminated polyester polymers, preferably having a molecular weight between about 1000 and about 5000.

Polyester polymers can be prepared from a polyfunctional alcohol containing three or more hydroxyl groups, one or more diols and one or more dibasic acids by interaction at elevated temperatures, such as 150 to 200° C., in the presence of an esterification catalyst, preferably an acidic catalyst. Some examples of these polyester polymers are the polymerization products of glycerol, 2,2-dimethyl-1,3-propanediol and succinic acid;
trimethylolpropane, diethylene glycol, and adipic acid;
trimethylolpropane, neopentyl glycol and diglycolic acid;
glycerol, diethylene glycol, and adipic acid;
trimethylolpropane, polyethylene glycol and thiadipropionic acid;
trimethylolethane, diethylene glycol, polyethylene glycol and oxydipropionic acid;
trimethylolpropane, 2,2 - bis[4 - (2 - hydroxypropoxy) phenyl]-propane and azelaic acid;
mannitol, diethylene glycol and diglycolic acid;
pentaerythritol, propylene glycol, sebacic acid, and isophthalic acid;
and trimethylolpropane, 3-methyl-2-azapentandiol-1,5 and azelaic acid.

Polyester polymers can be prepared from a poly-functional acid containing three or more acid groups, one or more diols and one or more dibasic acids by interaction under the conditions mentioned above. Some examples of these polyesters are the polymerization products of trimesic acid, diethylene glycol and adipic acid; citric acid, polyethylene glycol and adipic acid; citric acid, di-1,4-(2-hydroxypropoxy) benzene, fumaric acid and sebacic acid; benzene tetracarboxylic acid, propylene glycol, 1,4-butylene glycol and adipic acid; benzene tetracarboxylic acid; polyethylene glycol, and maleic acid; and benzene tetracarboxylic acid; 2,2-diethyl 1,3-propanediol, and diglycolic acid.

Polyester polymers can also be similarly prepared by reacting a polyfunctional acid containing three or more acid groups with a hydroxy or an amino acid. Some examples of such polyesters are the polymerization products of benzene tetracarboxylic acid and 12-hydroxy stearic acid; benzene tetracarboxylic acid and N-methyl β-alanine; polyacrylic acid and hydroacrylic acid; polyacrylic acid and N-methyl-omega-aminoundecanoic acid; polymethacrylic acid and N-methyl-6-amino caproic acid.

As dianhydride-extended polyesters, some examples are the reaction products of a linear, hydroxyl-terminated polydiethylene glycol adipate extended with pyromellitic dianhydride; a linear, hydroxyl-terminated polyester of 1,4-butylene glycol and diglycolic acid extended with 1,4,5,8-naphthalenetetracarboxylic dianhydride; and a linear, hydroxyl-terminated polyester of polypropylene glycol and isophthalic acid extended with cyclohexanetetracarboxylic dianhydride. The conditions of reaction are similar to the above but the catalyst may be omitted in some instances.

Other polyesters are the anhydride-extended polyether glycols prepared as above. Some examples are the reaction products of dianhydrides with polyether glycols such as pyromellitic dianhydride and polybutylene glycol; 1,4,5,8-naphthalenetetracarboxylic dianhydride and polypropylene glycol; and cyclohexanetetracarboxylic dianhydride and poly 3-methyl-1-4-butylene glycol.

Anhydride-extended polyether glycols can also be prepared from branched polyether alcohols and cyclic acid anhydrides. Some examples are the reaction products of the reaction product of propylene oxide and ethylene diamine with glutaconic anhydride; the reaction product of pentaerythritol with ethylene and propylene oxide with maleic anhydride; and a glycerine, ethylene oxide, propylene oxide reaction product of the formula

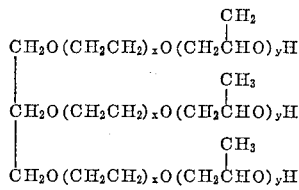

and succinic anhydride, wherein $x$ is a number from 1 to about 20 and $y$ is a number from 1 to about 100.

Another class of suitable curable polymers of this nature are the carboxyl and hydroxyl-containing vinyl-type polymers, such as acrylic addition copolymers which are prepared by polymerization in the presence of a peroxide-type catalyst. Some examples are copolymers of acrylic acid and butadiene; and partially hydrolyzed copolymer of maleic anhydride and butyl acrylate; butyl acrylate, 2-cyanoethyl acrylate and acrylic acid; methacrylic acid and butadiene; acrylic acid and isoprene; acrylic acid and chloroprene; methacrylic acid and isoprene; cinnamic acid and butadiene; crotonic acid and butadiene; acrylic acid and methoxyethyl acrylate; and acrylic acid, acrylonitrile and butadiene.

Another class of suitable curable polymers useful in the present invention are the polyfunctional amines of relatively high molecular weight. Examples of aliphatic polyfunctional amines are the various polyfunctional aliphatic amines which are derived from low polymers of unsaturated fatty acids. It appears that polymerization of the unsaturated fatty acids takes place by inter-molecular condensation at the double bonds. The resulting low polymers generally comprise dimers and trimers, although tetramers or higher polymers can also be formed. Although these polymers have extremely complex structures which are not known with particularity, postulated structures of the dimer and the trimer of linoleic acid, which indicate possible structures of these low polymers in general, are as follows:

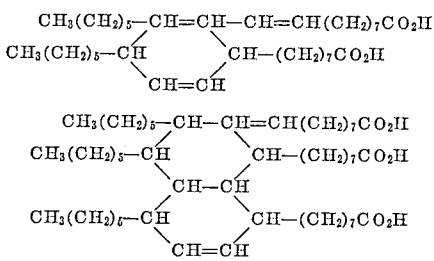

The preparation of such polymeric polyene fatty acids is described in United States Patents 2,482,761, 2,373,015 and 2,435,478.

The low molecular weight polymers of polyene fatty acids can be reacted with polyfunctional amines to form higher molecular weight materials which contain aliphatic amine and amide functional groups and fall within the class of aliphatic polyfunctional amines. A postulated structure for a product of this type (the reaction product of the dimer of linoleic acid and ethylene diamine) is as follows:

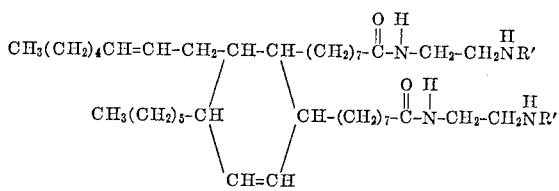

wherein $R'$ is hydrogen or another linoleic acid dimer group. When a dimer of a fatty acid, e.g., of linoleic acid, is condensed with a diamine, solid, thermoplastic materials usually result while if a polyamine containing three or more amino groups is used in place of the diamine, soft or liquid materials usually result. Resins of this general type are disclosed in United States Patent 2,450,940. Amine-terminated polyamides of this type, which will also be referred to as aliphatic polyfunctional amines, are available under the registered trademark "Versamid." Among these products, which are produced by the condensation of polycarboxylic acids with polyamines, are "Versamid" 100, a soft, tacky resin that is semisolid at room temperature, which melts at 43–53° C. and which has an amine value of 83–93; "Versamid" 115, a viscous liquid resin at room temperature which has a viscosity at 40° C. of approximately 500–750 poises (on a Brookfield viscometer using a No. 6 spindle and revolving at 4 r.p.m.) and an amine value of 210–230; "Versamid" 125, a fluid resin at room temperature which is reported to have a viscosity at 40° C. of approximately 80–120 poises (on a Brookfield viscometer using a No. 6 spindle and revolving at 4 r.p.m.) and an amine value of 290–320; and "Versamid" XD–140, derived dimeric polyene higher fatty acids of the type described hereinabove, which is a liquid at room temperature which has a viscosity at 25° C. of approximately 130±30 poises (on a Brookfield viscometer using a No. 6 spindle and revolving at 4 r.p.m.) and an amine value of approximately 325–360.

Aliphatic polyfunctional amines which contain no amide groups may be prepared from the polymerized polyene fatty acids, for example, by dehydration of the ammonium salt of the acid followed by hydrogenation of the resulting amide, during which the residual unsaturation may be partly or wholly removed. A postulated structure for a product of this reaction is exemplified by the following:

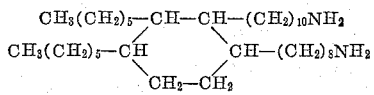

Aliphatic polyfunctional amines of this type are "Emery 3154–R" amine, a liquid resin at room temperature which has an amine value of approximately 177; and "Emery 654–27–R" amine, which is also liquid at room temperature and which has an amine value of approximately 155. These and the above amide group-containing polyfunctional amines can be designated generically as polyfunctional amines derived from low polymers of higher fatty acids.

The easily available aliphatic polyfunctional amines which contain relatively low concentrations of amine functional groups, e.g., the "Versamid" and "Emery Amine" products which are substantially liquid, that is, liquid or semi-solid at ordinary temperatures lend themselves to easy mixing with the curing agents, particularly when the latter are also liquids. Mixtures of the fatty acid amine polymers may be used if properties intermediate of two of them are desired, and in fact the commercially available products are themselves often mixtures and commonly contain an amount of unpolymerized material, but this does not destroy their utility for use in the present invention.

Another class of polymers useful as a curable polymer of the composition of this invention include the polyalkylene polysulfide polymers.

Commercially important polyalkylene polysulfide prepolymers (some of which are distributed under the registered trademark "Thiokol," as hereinafter noted) are derived from various polyfunctional organic halides and frequently from mixtures of such halides, reacted with an alkali metal polysulfide and thereafter treated as described in Patent Nos. 1,890,191, 2,049,974, 2,100,351, 2,216,044, 2,466,963, and 2,474,859.

The polyalkylene polysulfide prepolymers which may be utilized in the present invention may exist in the form of thin, syrupy liquids to thick, viscous liquids to solids. Their molecular weights may vary from about 500 to about 10,000 or higher. Normally liquid polymers are preferred for use in the present invention, such liquid polymers having an average molecular weight of from about 1,000 to about 5,000 or higher, as determined in the familiar manner by means of end group titration. The degree of copolymerization employed in the manufacture of the polyalkylene polysulfide prepolymer and the average molecular weight thereof influences the physical properties.

Examples of suitable polyalkylene polysulfide polymers include a thiol-terminated liquid polymer of bis(ethyleneoxy)methane having a viscosity at 25° C. of 350 to 450 poises, an average molecular weight of 4,000 and a pour point of 35° F. available as Thiokol LP–2, and a liquid polymer of bis(butyleneoxy)methane polymer under the trade name Thiokol LZ–205.

Another class of curable polymers suitable for use in the present invention include the low molecular weight polymerized fatty acids derived from unsaturated monomers having at least two double bonds and containing acyl groups. These polymerized fatty acids may be designated as polymerized polyene fatty acids or Emery acids. While the actual structure of these products is not known with particularity, it appears that the polymerization of the unsaturated fatty oils takes place by intermolecular condensation at the double bonds. The reaction products obtained generally comprise dimers, and trimers formed by condensation of two or three molecules of the fatty acids, respectively. Further polymerization can also give rise to tetramers or higher polymers. Commonly it is observed that a preponderance of the dimeric polymer is formed, in admixture with the trimeric polymer. While the dimeric products can be employed in substantially pure form in the compositions of the invention, the resulting cured end-products are not as desirable for some purposes as those formed from compositions containing the trimeric products or a mixture of dimeric and trimeric fatty acids, which produce more durable cured resins. Therefore, it is preferred to use trimeric or mixtures of dimeric and trimeric or higher polymers of the polyene fatty acids in the compositions of the invention. Illustrations of the polymeric fatty acids employed herein are, for example, the dibasic dimerized linoleic acid of approximately 600 molecular weight which is sold by Emery Industries, Inc. of Cincinnati, Ohio under the trade name "Emery Dimer Acid 3079–S"; and "Emery Trimer Acid 3055–S" which appears to be a tribasic acid trimer of linoleic acid of average molecular weight of approximately 845.

The cross-linking or curing agent is an organic compound capable of addition to the curable polymer through the site opened by the removal of the active hydrogen. These cross-linking or curing agents include epoxy resins, bis-alkylene amides, dicarboxylic acid anhydrides and diisocyanates.

As employed in this specification, the term "epoxy resin" relates to poly-epoxide compounds which contain reactive vicinal epoxy linkages available as reaction sites. One type of epoxy resin which has enjoyed a high degree of commercial success are those resins prepared from epichlorohydrin and polyhydric phenols, such as 2,2' - bis - (p-hydroxy phenyl) propane, resorcinol, and polyhydric novolak. A second class of epoxy resins are those prepared from polyhydric alcohols such as glycerine and pentaerythritol and epichlorohydrin. Another class of epoxy resins are those prepared from epichlorohydrin and amines containing reactive hydrogen atoms. A still further class of epoxy resins are those prepared by the direct epoxidation of aliphatic or aromatic unsaturated compounds.

Among the polyisocyanates which may be used in accordance with this invention to cross-link halogenated chain polymers are methylene di-p-phenyl diisocyanate, 4,4'-diphenyl diisocyanate, p-phenylene diisocyanate, hexamethylene diisocyanate, 4-methyl-m-phenylene diisocyanate, s-phenyl triisocyanate, 5-trifluoromethyl-m-phenylene diisocyanate, 3,3'-dichloro-4,4'-bi-phenyl diisocyanate, tetrachloro-p-phenylene diisocyanate.

The polyalkylenamides of this invention which are suitable as cross-linking agents may, in their preferred form, be represented by the following formula:

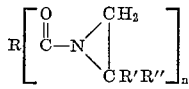

wherein R is an $n$-valent hydrocarbon radical having 4 to about 55 carbon atoms, such as an acyclic alkylene radical, or an arylene radical (for example, the 1,3-phenylene radical and the 1,4 - phenylene radical), or an aryline radical, such as 1,3,5-phenyline radical; and R' and R'' each represent hydrogen or an alkyl radical having from 1 to 8 carbon atoms; and $n$ is 2 to 4, preferably 2 to 3.

Among the N,N'-bis-1,2-alkylenamides useful as curing agents in accordance with the invention are N,N'-bis-ethylenadipamide;
N,N'-bis-ethylenisosebacamide;
N,N'-bis-1,2-butylenisosebacamide;
N,N'-bis-ethylensebacamide;
N,N'-bis-ethylensuberamide;
N,N'-bis-1,2-propylensuberamide;
N,N'-bis-1,2-butylensuberamide;
N,N'-bis-ethylenazelaamide;
N,N'-bis-1,2-propylenazelaamide;
N,N'-bis-1,2-butylenazelaamide;
N,N'-bis-ethylendodecanoyldicarboxylic acid amide;
N,N'-bis-ethylenetetradecanoyldicarboxylic acid amide;
N,N'-bis-1,2-propylenetetradecanoyldicarboxylic acid amide;
N,N'-bis-ethylenehexadecanoyldicarboxylic acid amide;
N,N'-bis-ethylenoctadecanoyldicarboxylic acid amide;
N,N'-bis-1,2-propylenoctadecanoyldicarboxylic acid amide;
N,N'-bis-1,2-propylenedodecanoyldicarboxylic acid amide; and
N,N'-bis-1,2-pentylensebacamide;
N,N'-bis-1,2-butylenisophthalamide;
N,N'-bis-1,2-propylenisophthalamide;
N,N'-bis-1,2-pentylenisophthalamide;
N,N'-bis-ethyleneterephthalamide;
N,N'-bis-1,2-propyleneterephthalamide;
N,N'-bis-1,2-butyleneterephthalamide; etc.

Mixtures of these monomers may be produced by employing mixed 1,2-alkylenimines in producing the monomers of the invention in accordance with the process of the invention.

The N,N'-bis-1,2-alkylenamide curing agents are prepared in monomeric form by the following two phase process: an aqueous solution of an 1,2-alkylenimine, desirably containing not more than 10 carbon atoms, such as ethylenimine, 1,2-propylenimine, 1,2-butylenimine, 1,2-pentylenimine, etc., is reacted in the presence of an organic solvent at a temperature between about —5 and about 30° C. with an aliphatic dicarboxylic acid chloride containing 6 to 50 carbon atoms, such as adipoyl dichloride, isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride, isophthaloyl chloride and terephthaloyl dichloride; to produce the desired substantially pure N,N'-bis-1,2-alkylenamide monomer, with hydrogen chloride as a by-product. The 1,2-alkylenimine is employed in a ratio of about 2 moles for each mol of acid chloride. Advantageously, an excess of 1,2-alkylenimine, such as about 5 percent by weight, over and above this ratio may be employed, although an excess of up to about 15 percent may be employed.

Typical examples of polycarboxylic acid anhydrides which may be utilized as a cross-linking agent are pyromellitic anhydride, trimellitic anhydride, tricarballylic anhydride, pyromellitic dianhydride, succinic anhydride, methyl succinic anhydride, $C_8$ alkenyl succinic anhydride, $C_{12}$ alkenyl succinic anhydride, $C_{25-30}$ alkenyl succinic anhydride, methyl maleic anhydride, chloromaleic anhydride, benzoic anhydride, nadic anhydride, methyl nadic anhydride, chlorendic anhydride, phthalic anhydride, and tetrabromo- or tetrachloro-phthalic anhydride.

In addition to the polymeric components and the cross-linking agent set forth above, the composition also includes an inorganic heat stable filler, such as titanium dioxide and silicon dioxide. The proportions of the filler to the combined polymers are between about 0.2:1 to about 0.75:1 by weight. The filler should have a pH between about 6 and about 8, preferably about 7.

An example of the two-part system herein disclosed and defined includes as one separable part, a liquid solution of the curable adduct or polymer, such as a carboxyl-terminated polyester, in an organic solvent, such as toluene. This part may also include fillers, such as silica and titanium dioxide. The second part of the system contains the cross-linking agent, such as a polyalkylenamide and the prebonding vinyl polymer, such as Saran. The alkylenamide and vinyl polymer are preferably also in solution in a solvent similar to the solvent of the first part or in a solvent compatible therewith, such as an aromatic solvent. These two parts are maintained separate until it is desired to form the bond. At that time, the two parts are admixed thoroughly and the pasty liquid is applied to both surfaces of the fabrics to be bonded together. The adhesive composition is allowed to dry for a few minutes and then the surfaces are pressed together. The orientable vinyl polymer forms a prebond or temporary bond which holds the surfaces of the fabric together so that it may be worked into place or otherwise handled without danger of the bond being separated. The curing will be effected at room temperature over a period of several hours. In some instances, warming or heating of the bonded surface will aid in completing the bond in a shorter period of time. After the bond is complete by the curing, the fabric is inseparable and the bond is usually as strong as the fabric itself.

Although it is preferred to mix the vinyl polymer with the curing agent in preparing the second part of the system, the vinyl polymer may be mixed with the curable polymer of part one without departing from the scope of this invention.

Various organic solvents may be used for dissolving the polymer components and the curing agent of the present invention. These solvents include such organic compounds as the aromatic hydrocarbons, such as benzene, toluene, xylene and naphthalene; the ketones, such as acetone, methyl ethyl ketone, and methyl isobutyl ketone; esters, such as methyl acetate, ethyl acetate, isopropyl acetate, butyl acetate, amyl acetate, "Cellosolve" acetate, and "Carbitol" acetate; and cyclic ethers, such as tetrahydrofuran, dioxane, tetrahydro-2-methylfuran, tetrahydropyran, trimethylene oxide, alpha-alpha-dimethylene oxide, dioxolane, 2-methyl-1,3-dioxolane, 2,6-dimethyltetrahydropyran, and 2,3-dimethyl-1,4-dioxane. The solvent should be sufficiently volatile that it will be easily and quickly evaporated under the environment of the bonding operation.

Various additives may be included in the above system in either the curable polymer component or in the curing agent component. For example, antioxidants, such as sym-di-beta-naphthyl-paraphenylenediamine and 4,4'-dithiodimorpholine, may be employed as an additive. Acid acceptors, such as alkali carbonates and bicarbonates, may also be employed. Pigments are often included in such compositions, such as carbon black and ferric oxide.

The amount of curing agent or cross-linking agent utilized in this system should be sufficient to complete the curing of the curable polymer. Usually a stoichiometric equivalent of the curing agent to the curable polymer is utilized, and this amount, of course, depends upon the number of active hydrogen sites on the curable polymer. It is preferred, however, to utilize not more than 20 percent stoichiometric excess of the curing agent. In general, the weight ratio of curing agent to curable polymer is between about 0.2:1 to 0.5:1. In general, the amount of the orientable or crystallizable polymer component of the system is approximately the same as or more than the amount of the curable polymer component. A satisfactory ratio of orientable polymer component to curable polymer component is about 1:1 to about 2.5 by weight, preferably 1.6 to 1.8 by weight. The important feature is that sufficient orientable polymer be utilized to adequately hold the bond together until curing is effected.

The surfaces to which the adhesive composition of the present invention is applicable include the synthetic resins in the form of films and textile fabrics, such as those made from nylon (diamine-dibasic acid copolymer), fiberglass, Orlon (polyacrylonitrile), Dacron (ethylene glycol-terephthalic acid copolymer) and cotton. The present adhesive also is adequately adherent to metal surfaces, such as copper, aluminum and steel. Other surfaces to which the adhesive may be applied include wood and paper.

The particular adhesive composition of the present invention is superior to present day adhesives in that in its cured condition the bond is solvent resistant and stable up to temperatures of 150° C. and above. The bis-alkylenamide containing adhesive composition is the preferred composition because this composition is self-curing at room temperature, and temperatures up to about 50° C. may be used in such a system to advantage if faster cures are desired. The bis-alkylenamide containing composition also possesses "dry tack" or affinity by the adhesive surfaces that are not tacky to the touch. The addition of the orientable polymer, particularly the use of polyvinylidene chloride, gives very good quick strength and resistance to cold flow. The low molecular weight curable polymer initially plays a part in the system in acting as a plasticizer for the orientable polymer, such as polyvinylidene chloride. The effect of the curable polymer as a plasticizer continues until it is cured and the bond is completed.

The following examples are offered as illustrative of the invention and of the compositions and methods described therein. The specific disclosures in the examples should not be considered unnecessarily limiting to the invention.

EXAMPLE I

An adhesive composition was prepared from the following components:

Part A

| | Weight, parts |
|---|---|
| Diethylene glycol adipate polyester | 100 |
| Silicon dioxide (UN Ultrasil) | 25 |
| Symmetrical di-beta-naphthyl - para - phenylenediamine (Agerite White) | 1 |
| Titanium dioxide | 20 |
| Hydrated ferric oxide | 0.114 |
| Lamp black | 0.271 |

Part B

A mixture of 24 parts by weight of N,N'-bis-ethylenisosebacamide diluted to 50 percent solids in toluene with an equal volume of 12 parts by weight of Saran in methyl isobutyl ketone.

Parts A and B were admixed prior to curing and used to bond two pieces of a fiberglass fabric and a piece of fiberglass fabric to zinc chromate primed aluminum surfaces. Before curing, the bond was insufficient for handling or application to a vertical or top undersurface in the case of both the fiberglass surface and the aluminum surface. The low prebonding strength of the adhesive was the result of the small amount of Saran used.

EXAMPLE II

The following adhesive was prepared and utilized as bonding agent as follows:

Part A

| | Weight, parts |
|---|---|
| Diethylene glycol adipate polyester | 100 |
| Silicon dioxide (UN Ultrasil) | 25 |
| Symmetrical di-beta-naphthyl - para - phenylenediamine (Agerite White) | 1 |
| Titanium dioxide | 20 |
| Hydrated ferric oxide | 0.114 |
| Lamp black | 0.271 |
| Methyl isobutyl ketone | 54 |

Part B

| | |
|---|---|
| N,N'-bis-ethylenisosebacamide | 25 |
| Symmetrical di-beta-naphthyl-para-phenylenediamine (Agerite White) | 1 |
| Toluene | 25 |
| Polyvinylidene chloride (Saran F–120), viscosity 1,000 centipoises | 170 |
| Phosphoric acid | 0.85 |
| Methyl isobutyl ketone | 690 |

Parts A and B of the above system were admixed to form viscous liquid and applied to two pieces of fiberglass cloth fabric and to fiberglass cloth and zinc chromate primed aluminum surface which were pressed together. The bond was cured at room temperature for about 24 hours. The initial bond between the cloth was sufficiently strong prior to complete curing to hold the overlapped fabrics and aluminum and overlap fabric in place during handling or in a vertical position or upside down position. The cured bond was firm and strong after 48 hours having a quantitative strength at 180° peel at two inches per minute of 10 pounds per inch width with the fiberglass to fiberglass and 6 pounds per inch width with fiberglass to primed aluminum.

Various techniques of combining the various components prior to applying them as a bond or adhesive may be practiced without departing from the scope of this invention. Also, various additives which act as antioxidants or stabilizers and pigments may be utilized in the composition together with materials to give body and the required viscosity of the composition without departing from the scope of this invention.

Having described my invention, I claim:

1. A method for adhering two normally solid surfaces together which comprises initially dissolving together in an organic solvent a linear vinyl polymer selected from the group consisting of polymers of vinylidine chloride, vinyl acetate, chloroprene, vinyl chloride, lower alkyl acrylates, lower alkyl methacrylates, and lower alkyl chloroacrylates orientable under a stress of from about 50 to about 200 p.s.i. and having a molecular weight above 20,000, a curable polymer having a molecular weight between about 500 and 10,000 selected from the group consisting of a saturated carboxyl-terminated polyester polymer, saturated hydroxyl-terminated polyester polymer, dianhydride-extended polyester, dianhydride-extended polyether glycol, carboxyl-containing vinyl polymer derived from monoethylenically unsaturated acids, hydroxyl-containing vinyl polymer, aliphatic polyfunctional amine, polyalkylene polysulfide polymer, and polymerized fatty acid derived from monomers having at least two double bonds, and a bis-1,2-alkylenamide as an organic cross-linking agent capable of curing the composition at substantially room temperature; dispersing in the solution an inorganic heat stable filler; coating at least one of said surfaces with the resulting solution, and then bringing said surfaces in contact with each other prior to drying of the solution; the weight ratio of the linear vinyl polymer to curable polymer being about 1:1 and about 2.5:1.

2. The method of claim 1 in which the weight ratio of curing agent to curable polymer in said resulting solution is between about 0.2:1 and about 0.5:1.

3. The method of claim 1 in which the curable polymer is a saturated carboxyl-terminated polyester polymer.

4. A liquid composition comprising an organic solution of a linear vinyl polymer selected from the group consisting of polymers of vinylidine chloride, vinyl acetate, chloroprene, vinyl chloride, lower alkyl acrylates, lower alkyl methacrylates, and lower alkyl chloroacrylates orientable under a stress of from about 50 to about 200 p.s.i. and having a molecular weight above 20,000, a curable polymer having a molecular weight between about 500 and 10,000 selected from the group consisting of a saturated carboxyl-terminated polyester polymer, saturated hydroxyl-terminated polyester polymer, dianhydride-extended polyester, dianhydride-extended polyether glycol, carboxyl-containing vinyl polymer derived from monoethylenically unsaturated acids, hydroxyl-containing vinyl polymer, aliphatic polyfunctional amine, polyalkylene polysulfide polymer, and polymerized fatty acid derived from monomers having at least two double bonds, and a bis-1,2-alkylenamide as an organic cross-linking agent capable of curing the composition at substantially room temperature and containing an inorganic heat stable filler dispersed therein; the weight ratio of the linear vinyl polymer to curable polymer being between about 1:1 and about 2.5:1.

5. Two normally solid surfaces bonded together with a cured solution of a linear vinyl polymer of vinylidene chloride having a molecular weight above 20,000, a saturated carboxyl-terminated polyester polymer having a molecular weight between about 1,000 and about 10,000 and a bis-1,2-alkylenamide as a cross-linking agent capable of curing the solution at substantially room temperature containing an inorganic heat stable filler dispersed therein; the weight ratio of the polymer of vinylidine chloride to polyester polymer being between about 1:1 and about 2.5:1.

6. A liquid curable adhesive composition which comprises an organic solution of a linear vinyl polymer of vinylidine chloride having a molecular weight above 20,000 as a prebonding agent, diethylene glycol adipate polyester and N,N'-bis-ethylenisosebacamide as a curing agent containing dispersed therein an inorganic heat stable filler; the weight ratio of polymer of vinylidine chloride and the diethylene glycol adipate polyester being between about 1:1 and about 2.5:1.

References Cited in the file of this patent

UNITED STATES PATENTS

| | | |
|---|---|---|
| 2,249,915 | Reinhardt et al. | July 22, 1941 |
| 2,446,581 | Gold et al. | Aug. 10, 1948 |
| 2,512,722 | Lanham | June 27, 1950 |
| 2,512,723 | Lanham | June 27, 1950 |
| 2,591,539 | Greenlee | Apr. 1, 1952 |
| 2,671,063 | Waldie | Mar. 2, 1954 |
| 2,678,284 | Holt | May 11, 1954 |
| 2,877,203 | Forsythe | Mar. 10, 1959 |
| 2,892,808 | Shafer | June 30, 1959 |
| 2,934,516 | Hicks | Apr. 26, 1960 |
| 2,980,656 | Jones et al. | Apr. 18, 1961 |

FOREIGN PATENTS

| | | |
|---|---|---|
| 599,523 | Great Britain | Mar. 15, 1948 |
| 624,393 | Great Britain | June 7, 1949 |
| 644,829 | Great Britain | Oct. 18, 1950 |
| 821,934 | Germany | Nov. 22, 1951 |
| 900,137 | Germany | Dec. 21, 1953 |

OTHER REFERENCES

Bjorksten et al.: "Polyesters and Their Applications," Reinhold Pub. Corp., New York (1956).

UNITED STATES PATENT OFFICE
CERTIFICATE OF CORRECTION

Patent No. 3,136,681                          June 9, 1964

James E. Johnston

It is hereby certified that error appears in the above numbered patent requiring correction and that the said Letters Patent should read as corrected below.

Column 3, line 29, for "3-methyl-2-azapentandiol-1,5" read -- 3-methyl-3-azapentandiol-1,5 --; column 4, line 44, for "$CH_3(CH_2)_5\text{-CH=CH-CH=CH}(CH_2)_7CO_2H$" read -- $CH_3(CH_2)_5\text{-CH-CH-CH=CH}(CH_2)_7CO_2H$ --.

Signed and sealed this 17th day of November 1964.

(SEAL)
Attest:

ERNEST W. SWIDER                          EDWARD J. BRENNER
Attesting Officer                             Commissioner of Patents